Patented Feb. 24, 1953

2,629,652

UNITED STATES PATENT OFFICE 2,629,652

POROUS ANHYDROUS LITHIUM HYDROXIDE GRANULES

William H. Schechter, Lawrence, Kans., and Elliott D. Osgood, Washington, D. C.

No Drawing. Application April 3, 1946, Serial No. 659,421

7 Claims. (Cl. 23—184)

(Granted under Title 35, U. S. Code (1952), sec. 266)

Our invention relates to an improved medium for the absorption of carbon dioxide gas from vitiated air. It is particularly designed for use in connection with ventilating apparatus in purifying vitiated air of carbon dioxide in the ventilation systems of such closed spaces as submarines. More particularly, our improved medium is a porous granulated, dust-free form of lithium hydroxide.

One application of our invention would be in connection with the constant automatic purification of air in submarines. Such closed atmospheres are contaminated with carbon dioxide gas at the rate of approximately 0.09 pound per man per hour. Were the gas not removed, its concentration would soon become great enough to render the air unsafe for breathing. For example, with 90 men aboard a submarine having an atmospheric volume of 33,000 cubic feet, a 3 per cent concentration of carbon dioxide is reached in 14 hours. A 3 per cent concentration of carbon dioxide is accepted as being the upper limit in inhaled air that does not impair the faculties.

The ultimate solution to the carbon dioxide removal in submarines and similar closed spaces appears to be a container of a suitable absorbent to be placed in the existing ventilation system to be used and replaced as required. Since the usual low pressure ventilating systems employ electrically driven blowers to circulate the air, it is apparent that such an absorbent should be free from dust or dusting, and should be of such a physical nature that air may pass freely through a column or container of the absorbent.

Prior to our invention a composition in general use for carbon dioxide absorption has been soda-lime, a mixture of sodium hydroxide and calcium hydroxide. This composition though a fairly efficient absorber of carbon dioxide has as an inherent defect, a weak, friable structure and consequently dusts readily. It is practically impossible to prevent some of these harmful dust particles from being carried throughout the system in which the composition is employed.

Lithium hydroxide, a much more efficient carbon dioxide absorbent, is currently employed in fine crystalline form. This compound, as the soda-lime mentioned above, dusts readily and is therefore objectionable, since the dust particles when inhaled are severely irritating and cause violent coughing spasms. In addition, the fact that this compound is employed in a finely divided state necessitates that it be spread out in thin layers in order to expose sufficient absorbent surface area to the contaminated air.

Accordingly, it is an object of our invention to provide an improved dust-free form of lithium hydroxide for the absorption of carbon dioxide from air which eliminates the disadvantages described as inherent in the absorbents of the prior art. That is to say, instead of employing crystals of lithium hydroxide we employ the said compound in the form of hard, porous granules which are essentially dust free, resistant to crumbling, and sized to make resistance to air flow low enough for use in containers on a blower or in a ventilating system.

Briefly, our invention comprises the process of preparing lithium hydroxide in a novel form and the product of said process and includes the several steps and relationship of said steps each to the other and the product having the properties all of which will be more fully described hereinafter.

According to the method of the present invention, porous anhydrous, non-dusting granules of lithium hydroxide are prepared by pressing crystalline lithium hydroxide monohydrate having a water content of between about 40% and 45% under pressures of 18,000 to 25,000 pounds per square inch to form a cake, crushing the cake into granules to approximately the desired size, screening out the fines resulting therefrom, and heating the granules to the anhydrous condition. A preferred method for producing our product is as follows:

Lithium hydroxide, in fine crystalline or pulverized form, is monohydrated to contain between about 42% and about 45% of water. The lithium hydroxide monohydrate is pressed at about 25,000 pounds per square inch to form cakes or lumps.

These cakes are crushed in a convenient apparatus such as a granulator or grinder to approximately the desired size. The crushed material is then screened to size.

Granules remaining after the screening operation are oven-dried at from about 100° C. to about 150° C. for from one to two hours or until the granules are anhydrous. The drying operation results in the removal of all combined water and leaves behind granules which have a finely and intimately pored structure, the pores or voids representing from 60 to 70 per cent of the dried material by volume. Moreover, the dried porous granules are possessed of a high degree of durability and hardness.

The porosity imparted to the granules by the drying operation herein described presents a very large absorbent surface area to the contaminated air in that the interior surfaces as well as the exterior surfaces of the granules are exposed. These hard, dried, porous granules constitute the final dust-free product.

The water content of lithium hydroxide monohydrate, $LiOH \cdot H_2O$ is theoretically 42.86 per cent. We have found that using as a starting material lithium hydroxide containing more than 45 per cent water, which material appears wet and heavy, an inferior product with respect to hardness is obtained.

Similarly, products of inferior hardness are obtained when a starting material containing substantially less than 41.5 per cent water, appearing dry and approaching a free-flowing state, is used. By using as a starting material a lithium hydroxide with water content lying between about 42 and 45 per cent, we are able to produce granules having hardness numbers of 90 and more.

The hardness number of the anhydrous granules of lithium hydroxide is determined following the procedure set forth in U. S. Navy Bureau of Ships Ad Interim Specification 51S26 (INT) of January 2, 1944, and also in the U. S. Pharmacopoeia 12th edition of November 1, 1942, at pages 585,586, for determining the hardness number of soda lime. The procedure is as follows: 50 grams of the anhydrous lithium hydroxide granules previously screened to size on a No. 14 sieve by shaking and tapping for 5 minutes in a Rok-Tap sieving machine running at the rate of 1750 revolutions per minute of the driving shaft is placed in an 8-inch diameter metal pan having a brass concave bottom $\frac{5}{16}$-inch thick at the rim and $\frac{3}{16}$-inch thick at the center. Fifteen steel balls of $\frac{5}{16}$-inch diameter are also placed in the pan and the whole shaken and tapped over a period of ½ hour in the Ro-Tap sieving machine running at the rate of 1750 revolutions per minute of the driving shaft. The steel balls are removed from the pan and the contents brushed onto a No. 14 sieve and shaken and tapped for a period of 3 minutes in the Ro-Tap sieving machine. The weight of the material remaining on the screen, multiplied by 2, is the hardness number of the granules. This figure in grams, multiplied by 2, gives the hardness number. For example, if 45 grams of material remained in the sieve, the hardness number would be 90. Granules produced according to our process generally have hardness numbers of 90 or larger and are essentially dust-free in use and free from dusting in storage and handling.

By the term Ro-Tap hardness number as used in the appended claims is meant the hardness number obtained following the above procedure.

As a semi-quantitative means of determining the dustiness of our product, the material which remains in the Ro-Tap after the hardness test may be placed in a clean sieve with clean steel balls and replaced in the Ro-Tap. After another 5 minutes of operation substantially the entire 45 grams of material will still be present in the sieve, showing that no appreciable amount of fines has been sifted out and that the product has not cracked, crumbled or dusted.

Another method of determining the dustiness of our product in use is to use a simulated service test which comprises causing air to flow through a canister of granules having hardness numbers of 90 or more, and collecting dust particles on a weighed glass-fiber filter unit located at the discharge end of the canister. A number of such tests indicated no apparent increase in the weight of the filter unit after several hours of operation.

Briefly, then, our invention provides as an improved form of carbon dioxide gas absorbent, granules of lithium hydroxide which are hard enough to reduce dusting in their handling and use to a negligible degree. The product can be made in the form of granules of such size as to permit satisfactory air flow through containers of the material for use on blowers or in ventilating systems. The porous structure of the granules provides a large absorbent surface area and permits reaction with carbon dioxide within the granules as well as on their surfaces. This physical form of the compound combined with its high efficiency of absorption makes it practicable to obtain nearly complete saturation of the compound with carbon dioxide. Furthermore, neither the granules themselves nor the lithium carbonate formed in the reaction between the lithium hydroxide and carbon dioxide is hygroscopic, so that in use the canistered material does not absorb appreciable amounts of water and consequently has no tendency to become soupy in nature and inconvenient to handle.

The invention described herein may be manufactured and used by or for the Government of the United States of America for governmental purposes without the payment of any royalties thereon or therefor.

What is claimed is:

1. A method of preparing porous, anhydrous, non-dusting granules of lithium hydroxide which comprises pressing crystalline lithium hydroxide monohydrate having a water content of between about 40 and 45% under a pressure of at least 18,000 pounds per square inch to form a cake, breaking the cake into granules, separating the fines from the granules and heating the granules at a moderately elevated temperature to the anhydrous condition.

2. A method of preparing porous, anhydrous, non-dusting granules of lithium hydroxide which comprises pressing crystalline lithium hydroxide monohydrate having a water content of between about 40 and 45% under a pressure from 18,000 to about 25,000 pounds per square inch to form a cake, breaking the cake into granules, separating the fines from the granules and heating the granules at a moderately elevated temperature to the anhydrous condition.

3. A method of preparing porous, anhydrous, non-dusting granules of lithium hydroxide which comprises pressing crystalline lithium hydroxide monohydrate having a water content of between about 42 and 45% under a pressure of about 25,000 pounds per square inch to form a cake, breaking the cake into granules, separating the fines from the granules and heating the granules at a moderately elevated temperature to the anhydrous condition.

4. Porous, anhydrous, non-dusting granules of lithium hydroxide prepared by pressing crystalline lithium hydroxide monohydrate having a water content of between about 42 and 45% under a pressure of at least 18,000 pounds per square inch to form a cake, breaking the cake into granules, separating the fines from the granules and heating the granules at a moderately elevated temperature to the anhydrous condition, said anhydrous granules having a finely pored structure of greater void volume than solid volume and a Ro-Tap hardness number between about 90 and 100.

5. Porous, anhydrous, non-dusting granules of lithium hydroxide as defined in claim 4, wherein the void volume of the granules is not less than about 60%.

6. Porous, anhydrous, non-dusting granules of lithium hydroxide as defined in claim 4, wherein the void volume of the granules is from about 60 to 70%.

7. Porous, anhydrous, non-dusting granules of lithium hydroxide prepared by pressing crystalline lithium hydroxide monohydrate having a water content of between about 42 and 45% under a pressure of about 25,000 pounds per square inch to form a cake, breaking the cake into granules, separating the fines from the granules and heating the granules at a moderately elevated temperature to the anhydrous condition, said anhydrous granules having a finely pored structure of void volume not less than about 60% and a Ro-Tap hardness number between about 90 and 100.

WILLIAM H. SCHECHTER.
ELLIOTT D. OSGOOD.

REFERENCES CITED

The following references are of record in the file of this patent:

UNITED STATES PATENTS

| Number | Name | Date |
|---|---|---|
| 1,026,724 | Trump et al. | May 21, 1912 |
| 2,007,742 | Brown | July 9, 1935 |
| 2,035,845 | Stanton | Mar. 31, 1936 |
| 2,322,206 | Gardenier | June 22, 1943 |
| 2,488,485 | Winternitz | Nov. 15, 1949 |

OTHER REFERENCES

Thorpe's "Dictionary of Applied Chemistry," vol. 7, 4th ed., (1946), page 367. Longmans, Green & Co., N. Y.

J. W. Mellor's "Inorganic and Theoretical Chemistry," vol. 2, 1922 ed., page 500. Longmans, Green & Co., N. Y.

"Unit Spray-Drying and Reaction-Chambers" by Bowen Research Corp., Garwood, N. J. Bulletin No. 3, 1936.